United States Patent
Kellner et al.

(10) Patent No.: US 11,011,791 B2
(45) Date of Patent: May 18, 2021

(54) METHOD FOR PRODUCING AN ELECTRICALLY DRIVEN VEHICLE

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 342 days.

(21) Appl. No.: 16/039,795

(22) Filed: Jul. 19, 2018

(65) Prior Publication Data

US 2019/0047419 A1 Feb. 14, 2019

(30) Foreign Application Priority Data

Aug. 9, 2017 (DE) .......................... 102017118120.2

(51) Int. Cl.
*H01M 50/20* (2021.01)
*B60L 50/64* (2019.01)
(Continued)

(52) U.S. Cl.
CPC ............ *H01M 50/20* (2021.01); *B21D 53/88* (2013.01); *B60K 1/04* (2013.01); *B60L 50/64* (2019.02);
(Continued)

(58) Field of Classification Search
CPC ............. H01M 2/1077; H01M 2/1088; H01M 2/1083; H01M 2220/20; H01M 50/20;
(Continued)

(56) References Cited

U.S. PATENT DOCUMENTS 8,397,853 B2 3/2013 Stefani et al.
8,469,129 B2 6/2013 Mildner et al.
(Continued)

FOREIGN PATENT DOCUMENTS

CN 102514469 A 6/2012
CN 103857584 A 6/2014
(Continued)

OTHER PUBLICATIONS

German Examination Report for German Application No. 10 2017 118 120.2, dated Apr. 25, 2018, with partial English translation—7 pages.

(Continued)

*Primary Examiner* — Jermie E Cozart
(74) *Attorney, Agent, or Firm* — RatnerPrestia

(57) ABSTRACT

A method for producing an electrically driveable vehicle which has a sealed space for accommodating a high-voltage (HV) energy storage. A body structure delimits the space for accommodating the HV energy storage at least in an upward direction and which sealingly closes off the space at least in the upward direction and which has attachment points for the direct or indirect connection of at least one energy storage module. At least one energy storage module is connected to the body structure. A space for accommodating the HV energy storage is open at least in partial regions. An installation protection structure delimits the space for accommodating the HV energy storage in the downward direction and which sealingly closes off the space at least in the downward direction. The body structure is connected to the installation protection structure, whereby the space for accommodating the HV energy storage is sealingly closed.

16 Claims, 2 Drawing Sheets

(51) Int. Cl.
  *H01M 50/249* (2021.01)
  *B21D 53/88* (2006.01)
  *B60S 5/06* (2019.01)
  *B60K 1/04* (2019.01)
  *B60L 50/90* (2019.01)

(52) U.S. Cl.
  CPC .............. *B60L 50/90* (2019.02); *B60S 5/06* (2013.01); *H01M 50/249* (2021.01); *B23P 2700/50* (2013.01); *B60K 2001/0438* (2013.01); *B60Y 2306/01* (2013.01); *H01M 2220/20* (2013.01); *Y10T 29/49622* (2015.01)

(58) Field of Classification Search
  CPC ........ H01M 50/249; B60L 50/64; B60K 1/04; B60K 2001/0438; B60S 5/06; B60Y 2306/01; B23P 2700/50; B21D 53/88; Y10T 29/49622
  See application file for complete search history.

(56) References Cited

U.S. PATENT DOCUMENTS

| | | | |
|---|---|---|---|
| 9,601,733 | B2 | 3/2017 | Sham |
| 9,929,389 | B2 | 3/2018 | Klimek et al. |
| 10,166,883 | B2 | 1/2019 | Brendecke et al. |
| 10,297,882 | B2 | 5/2019 | Yan et al. |
| 10,468,645 | B2 | 11/2019 | Jackson et al. |
| 2011/0300427 | A1* | 12/2011 | Iwasa ................ B60K 1/04 429/99 |
| 2014/0082918 | A1* | 3/2014 | Grevener ........ B62D 25/2009 29/469 |
| 2015/0255764 | A1* | 9/2015 | Loo .................... B60K 1/04 429/149 |
| 2016/0006008 | A1 | 1/2016 | Volz |
| 2016/0276638 | A1 | 9/2016 | Sham |

FOREIGN PATENT DOCUMENTS

| | | | |
|---|---|---|---|
| CN | 103959508 A | | 7/2014 |
| CN | 104393209 A | * | 3/2015 |
| CN | 105835679 A | | 8/2016 |
| CN | 205666266 U | | 10/2016 |
| CN | 106364299 A | | 2/2017 |
| CN | 106374066 A | | 2/2017 |
| DE | 102009006990 A1 | | 8/2010 |
| DE | 102010011890 A1 | | 9/2011 |
| DE | 102013204765 A1 | | 9/2014 |

OTHER PUBLICATIONS

Ohinese Office Action for Chinese Application No. 2018108625396, dated Feb. 9, 2021 with translation, 16 pages.

* cited by examiner

METHOD FOR PRODUCING AN ELECTRICALLY DRIVEN VEHICLE

CROSS-REFERENCE TO RELATED APPLICATION

This application claims priority to German Patent application No. DE 10 2017 118 120.2, filed Aug. 9, 2017, which is incorporated by reference herein in its entirety.

FIELD OF THE INVENTION

The invention relates to a method for producing an electrically driveable vehicle which has a sealed space for accommodating a high-voltage energy storage. A vehicle of said type may by all means also be a partially electrically driveable vehicle, which may thus have an internal combustion engine.

BACKGROUND OF THE INVENTION

High-voltage (abbreviated: HV) energy storages for electric vehicles must be protected in the event of a crash in order to ensure that the battery does not catch fire. It is furthermore necessary for the space in which the HV components are situated to be sealed against the ingress of water or moisture. Therefore, in the prior art, HV energy storages are normally composed of a battery support structure via which, in the event of a crash, a major part of the loads are dissipated, and a battery housing cover and a battery housing base, which are connected to the battery support structure and which thereby sealingly close the HV energy storage. The battery support structure normally has an outer frame, inner longitudinal profiles, and transverse struts, which are arranged between the modules and which are connected to the outer frame and to the inner longitudinal profiles, and thus form the transverse-load paths of the battery frame. The HV energy storage is connected to the body structure in an installation step.

DE 10 2009 006 990 A1, which is incorporated by reference herein, has disclosed a body floor structure with a vehicle tunnel for accommodating a battery module and with an installation plate as a support structure for the battery module. Here, the interfaces of the battery housing thus formed are realized in air-tight form. Here, the battery modules are arranged exclusively in the region of the vehicle tunnel. The sealing of the space in which the battery modules are arranged is accordingly realized exclusively in the locally limited region of the vehicle tunnel by means of the body. The battery modules are connected to the support structure, which is installed onto the body from below and which close, in a downward direction, the space in which the battery modules are arranged.

DE 10 2010 011 890 A1, which is incorporated by reference herein, describes a carrier structure for the fastening of a battery module, wherein a carrier plate is connected, between two longitudinal members, to the vehicle body. A water-tight battery space is formed by a central tunnel as a cover. The battery modules are connected to the support structure, which is installed onto the body from below and which closes, in a downward direction, the space in which the battery modules are arranged.

DE 10 2013 204 765 A1, which is incorporated by reference herein, has disclosed a storage cell structural unit with a liquid-tight and/or gas-tight housing for a vehicle. The housing has four side walls, a top wall and a base wall. The housing is connected to a right-hand and a left-hand side sill. The right-hand and left-hand side sills are in turn connected to one another by means of a floor panel of the vehicle body. Here, the housing is not formed as a constituent part of the body. The sealing of the space in which the battery cells are arranged is realized by means of the housing, not by means of the body.

U.S. Pat. No. 8,397,853 B2, which is incorporated by reference herein, has disclosed an electrical energy storage which is arranged below the body or a central tunnel and which is delimited in a downward direction by horizontal base plates. Here, the housing is not formed as a constituent part of the body, but rather is connected to a sill and to the central tunnel. The sealing of the space in which the battery cells are arranged is realized by means of the housing, not by means of the body.

SUMMARY OF THE INVENTION

It is an object of the present invention to specify a method which, with simple installation of the energy storage module, ensures a particularly expedient force flow from the energy storage module into the body structure, with optimum sealing of the space for accommodating the HV energy storage.

The object is achieved by means of a method for producing the electrically driveable vehicle which has a sealed space for accommodating an HV energy storage has at least the following steps:

1. providing a body structure which delimits the space for accommodating the HV energy storage at least in an upward direction and which sealingly closes off said space at least in the upward direction and which has attachment points for the direct or indirect connection of at least one energy storage module;
2. providing at least one energy storage module;
3. connecting at least one energy storage module directly and/or indirectly to the body structure, wherein the space for accommodating the HV energy storage is open at least in partial regions, and not closed, at least in a downward direction;
4. providing an installation protection structure which delimits the space for accommodating the HV energy storage at least in the downward direction and which sealingly closes off said space at least in the downward direction;
5. connecting the body structure to the installation protection structure, whereby the space for accommodating the HV energy storage is sealingly closed.

Therefore, in the method according to aspects of the invention, the structure that serves for supporting the battery is integrated into the body structure. The body structure thus provides the mounting points for the HV components. Furthermore, the body structure seals the space in which the HV components are situated, at least in an upward direction. The sealing in a downward direction is realized by means of an installation protection structure which is connected to the body structure after the installation of the HV components.

The advantages of this method consist in a cost reduction resulting from functional integration and a considerable reduction in the number of parts, and furthermore in the reduction of the number of interfaces, in particular of a battery frame with respect to the body. Improved utilization of the package is furthermore ensured. For example, a free space for installation purposes between HV energy storage and body can be omitted, and a battery housing cover can also be omitted. This leads to a reduction of the dimension chain in a Z direction. More space for so-called active material, or improved seat comfort for occupants, is provided.

It is not necessary for the method steps 1. to 5. to be performed in the stated sequence. In particular, the method steps 1. and 2. may be performed in an arbitrary sequence before the method step 3., and the method step 4. may be performed arbitrarily before the method step 5.

In one refinement of the method, it is provided that the space for accommodating the HV energy storage is, in the first method step, delimited in the upward direction at least partially by a body floor structure of the body structure and laterally at least partially by a lateral body longitudinal member structure of the body structure.

In particular, the space for accommodating the HV energy storage is sealingly closed toward the side by the body structure and/or the installation protection structure.

The sealing of the space for accommodating the HV energy storage in the body structure is preferably performed by means of thermal joining methods, for example welding, and/or by application of adhesive and/or by application of plastics, such as for example PVC or a plastics foil additionally applied after the body construction stage, which plastics foil is arranged above and/or below the body structure that delimits the space for accommodating the HV energy storage, and/or by means of a single-part or multi-part deep-drawn metal plate, which is arranged in the region of the space, which is to be sealed, for accommodating the HV energy storage.

A body structure is preferably provided which, on the top side of the space for accommodating the HV energy storage, is composed of steel at least in partial regions. The use of the material steel is particularly advantageous from a fire protection aspect.

With regard to method step 3., it is considered to be particularly advantageous if the arrangement of the at least one energy storage module in said step is performed, in a vehicle transverse direction, at least substantially outside a vehicle tunnel of the vehicle in the region of the body floor structure.

Preferably, during the connection of the at least one energy storage module to the body structure, in the case of an indirect connection of the energy storage modules to the body structure, provision is also made for at least one structural component to be provided and connected to the body structure, to which at least one structural component the at least one energy storage module is directly connected. The following installation sequence is thus preferably performed: connecting the structural component to the body structure, and connecting the energy storage module to the structural component.

It is advantageous if, during the method step of the connection of the at least one energy storage module to the body structure, provision is made for an HV assembly to be provided and connected to the body structure, wherein the MV assembly is composed of at least one energy storage module and at least one structural component, for example a carrier profile, and/or at least one electrical rail and/or at least one temperature-control component/temperature-control unit, for example a cooling line etc. Accordingly, an HV assembly is formed which is composed of at least one energy storage module and of at least one further component, which is subsequently connected to the body structure. The following installation sequence is thus performed: connecting the energy storage module to the further component to form the HV assembly, and connecting the HV assembly to the body structure.

In particular, the HV assembly is connected in uninstallable fashion to the body structure.

During the method step of the connection of the HV assembly to the body structure, it is provided in particular that the energy storage modules and/or the structural components are connected to the body structure, wherein the energy storage modules preferably have no direct connection to, and are not in direct contact with, the installation protection structure.

The energy storage modules are in particular formed with integrated transverse-load paths. Furthermore, energy storage modules are preferably formed with integrated temperature-control means.

The connection to the body structures and installation structure may be realized in a wide variety of ways, for example in cohesive, non-positively locking or positively locking form or by means of combinations of said connection types.

With regard also to the installation protection structure, it is considered to be particularly advantageous if the latter is connected in uninstallable fashion to the body structure.

The connection between body structure and installation protection structure is in particular of water-tight form. Said sealing is preferably realized by means of adhesive bonding and/or by the compression/pressing-on of an elastic and/or plastic seal. Said seal is for example a window adhesive or a butyl cord.

The leak-tightness of the body structure is preferably checked, wherein this step is performed after the step of providing the body structure and before the step of connecting an energy storage module to the body structure. The checking of the leak-tightness is thus performed at a time after the painting stage in the automobile manufacturing process.

It is furthermore considered to be advantageous if the leak-tightness of the overall system is checked. This step is performed in particular after the step of the connection of the body structure to the installation protection structure.

It is preferable for all steps of the method according to aspects of the invention or all steps of the described refinements of the method according to aspects of the invention to be performed before the installation of the chassis/of the drive, that is to say before the so-called marriage, in the automobile manufacturing process.

The method according to aspects of the invention and the described refinements thereof thus make it possible for the battery support structure to be integrated into the body structure. The body structure thus provides the mounting points for the HV components. Furthermore, the body structure seals the space in which the HV components are situated, at least in an upward direction. The sealing in a downward direction is realized by means of the installation protection structure which is connected to the body structure after the installation of the HV components. The battery modules are connected to the body either directly or indirectly via a further structural component (as a constituent part of the battery pre-installation unit) which is not a constituent part of the installation protection structure which imparts a sealing action from below. Whereas the direct and/or indirect connection of at least one energy storage module to the body has already taken place in the method step 3., the installation protection structure is installed on the body for the first time in the method step 5. The installation protection structure is thus not designed as a carrier plate for the energy storage modules. The advantage is that the heavy battery modules are connected to the body and do not stand on the lower plate. A further advantage is that said lower cover has a spacing to the battery modules, which serves as a deformation zone in the event of an object being run over and in bollard tests. The sealing of the space in which the battery modules are arranged is realized by means of the body structure and the installation protection structure.

BRIEF DESCRIPTION OF THE DRAWINGS

Further features of the invention will emerge from the subclaims, from the appended drawing and from the description of the exemplary embodiments depicted in the drawing for the purposes of illustrating a vehicle produced in accordance with the method, without being restricted thereto.

In the drawing.

DETAILED DESCRIPTION OF THE INVENTION

Figure 1:
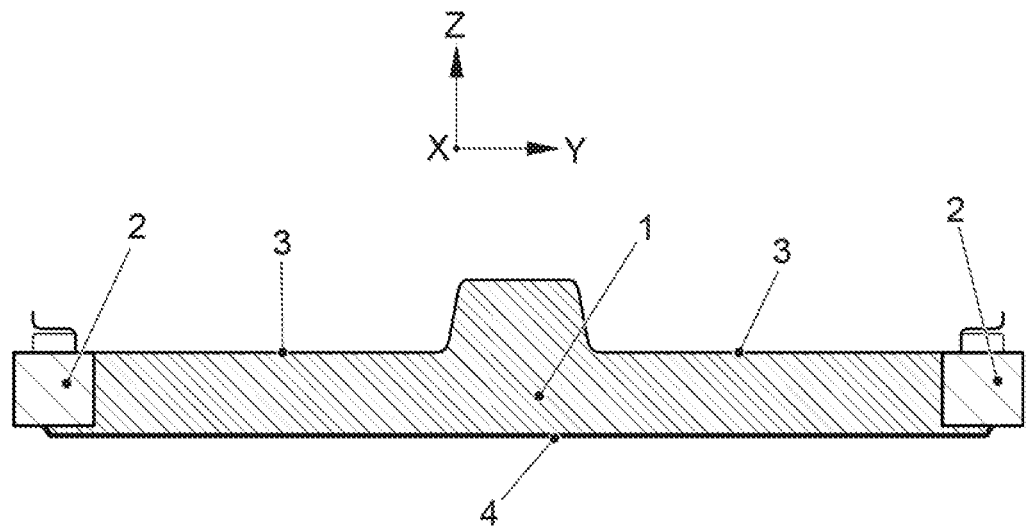
FIG. 1 shows an exemplary illustration of the space for accommodating an HV energy storage in an electrically driveable vehicle, specifically in an exclusively electrically driveable passenger motor vehicle.

FIG. 1 shows, in the section in the Y-Z plane, a space 1 for accommodating an HV energy storage. Said space 1 is delimited on both sides of the vehicle in each case by a lateral body structure 2. At the top, the space 1 is delimited by a body floor structure 3, and at the bottom, said space is delimited by an installation protection structure 4. The stated parts of the body structure constitute the bodyshell structure of the vehicle.

Figure 2:
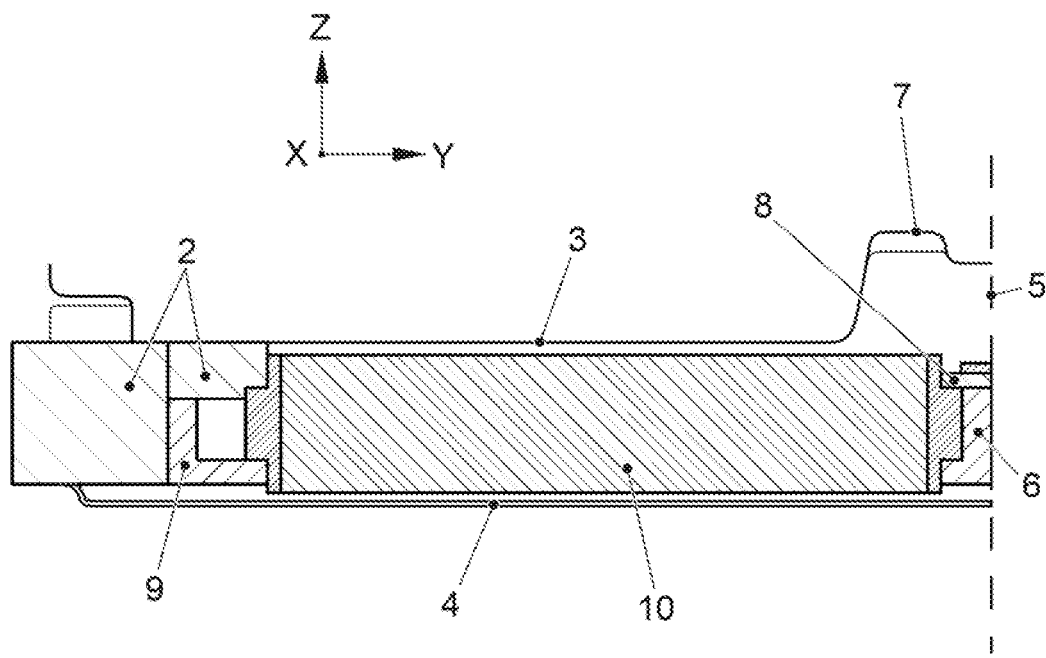
FIG. 2 shows an exemplary illustration of the overall structure such as is realized after the method step 5., Illustrated for a left-hand half of the vehicle.

FIG. 2 shows the relevant region of the vehicle after the steps according to aspects of the invention for the production thereof, that is to say after the method step 5. Only the left-hand half of the structure sectioned in the Y-Z plane is shown. The right-hand half is of mirror-symmetrical form about a plane of symmetry 5, which constitutes the plane of symmetry of a central longitudinal profile 6 and which is arranged in an X-Z direction. The illustration shows a lateral body structure 2 and a body tunnel structure 7 above the central longitudinal profile 6. An installation bridge 8 is mounted in the centre longitudinal profile 6, and an installation element 9 is mounted in the lateral body structure 2. By means of the installation bridge 8, an energy storage module 10—a battery module—is mounted in the body tunnel structure 7, and the energy storage module 10 is mounted in the lateral body structure 2 by means of the installation element 9.

Figure 3:
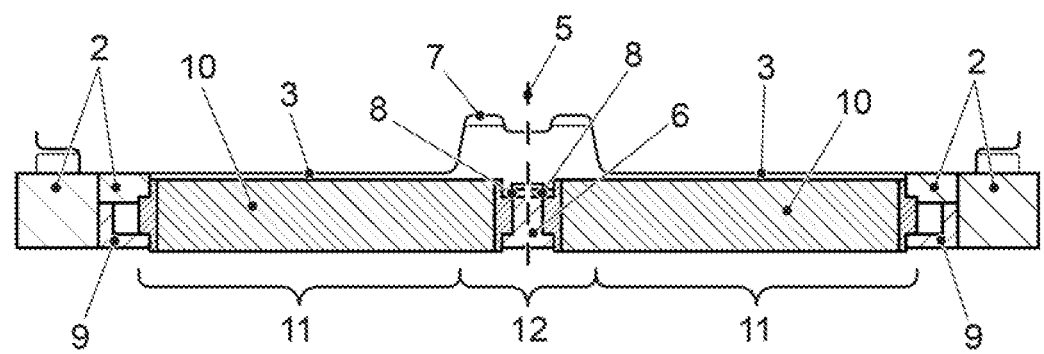
FIG. 3 shows an exemplary illustration of the arrangement of the battery modules substantially in the region of the body floor structure, outside the region of the vehicle tunnel, after the method step 3., in a section in a Y-Z plane (X: vehicle longitudinal direction, Y: vehicle transverse direction, Z: vehicle vertical direction)
Figure 4:
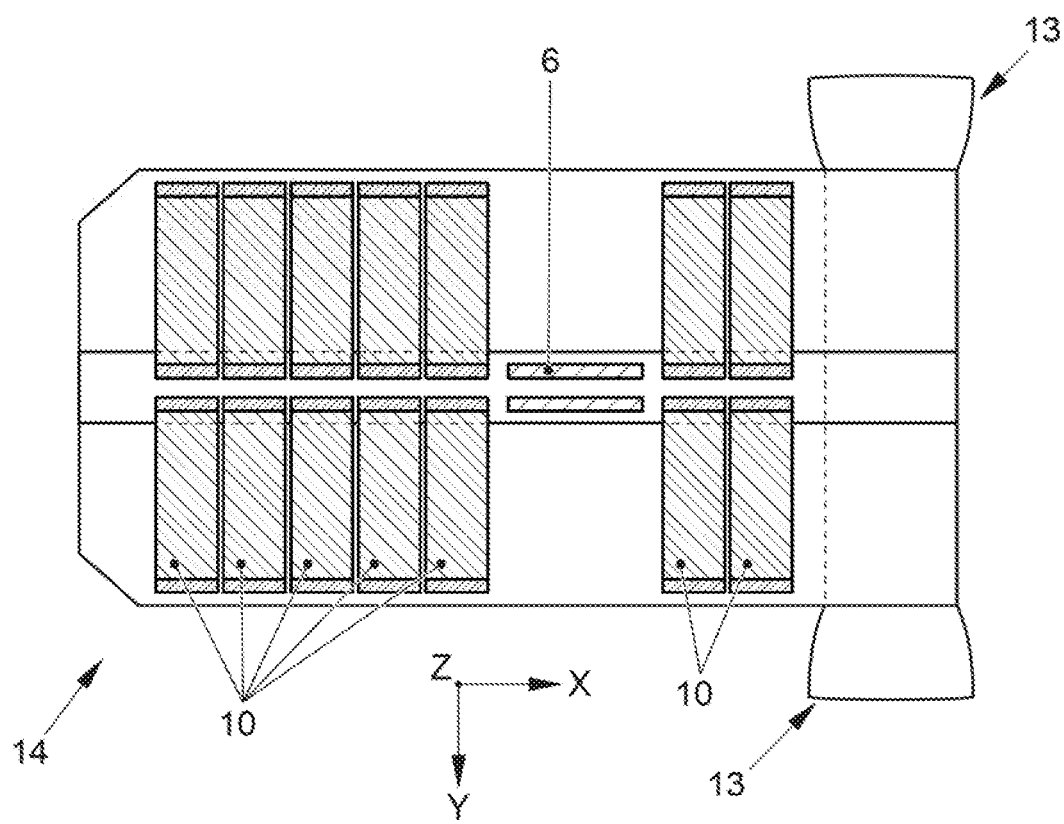
FIG. 4 shows the arrangement as per FIG. 3 in a view Z as per FIG. 3, viewed from below.

FIG. 3 shows, for the state after method step 3., that is to say before the connection of the installation protection structure 4 to the body structure, the regions 11 in which the energy storage module 10 is arranged in the region of the body floor structure 3 and a region 12 in which the energy storage module 10 is arranged in the region of the body tunnel structure 7. FIG. 4 shows, for said state, said regions 11 and 12 in a view from below. Also schematically indicated is a rear axle 13 of the vehicle and that end 14 of the vehicle which faces toward the rear bumper of the vehicle.

With regard to the individual method steps for the production of the electrically driveable vehicle, including the refinement of said method, reference is made to the detailed description preceding the description of the figures.

LIST OF REFERENCE DESIGNATIONS

1 Space
2 Lateral body structure
3 Body floor structure
4 Installation protection structure
5 Plane of symmetry
6 Central longitudinal profile
7 Body tunnel structure
8 Installation bridge
9 Installation element
10 Energy storage module
11 Region
12 Region
13 Rear axle
14 End

What is claimed is:

1. A method for producing an electrically driveable vehicle which has a space for accommodating at least one energy storage module, the method comprising the steps of:
　1. providing a body structure which delimits the space for accommodating the at least one energy storage module at least in an upward direction and which substantially sealingly closes off said space at least in the upward direction and which has attachment points for indirect connection of the at least one energy storage module;
　2. providing the at least one energy storage module;
　3. connecting the at least one energy storage module indirectly to the body structure, wherein the space for accommodating the at least one energy storage module is open at least in partial regions, and not closed, at least in a downward direction, wherein, during indirect connection of the at least one energy storage module to the body structure, provision is also made for at least one structural component to be provided and connected to the body structure, to which said at least one structural component the at least one energy storage module is directly connected;
　4. providing an installation protection structure which delimits the space for accommodating the at least one energy storage module at least in the downward direction and which sealingly closes off the space at least in the downward direction;
　5. connecting the body structure to the installation protection structure, whereby the space for accommodating the at least one energy storage module is sealingly closed.

2. The method as claimed in claim 1, wherein the method steps 1. and 2. are performed in an arbitrary sequence before the method step 3., and the method step 4. is performed arbitrarily before the method step 5.

3. The method as claimed in claim 1, wherein the space for accommodating the at least one energy storage module is, in the method step 1., delimited in the upward direction at least partially by a body floor structure of the body structure and laterally at least partially by a lateral body longitudinal member structure of the body structure.

4. The method as claimed in claim 1, wherein the space for accommodating the at least one energy storage module is sealingly closed toward at least one side by the body structure or the installation protection structure.

5. The method as claimed in claim 1, wherein the sealing of the space for accommodating the at least one energy storage module in the body structure is performed by at least one of thermal joining methods, application of adhesive, application of plastics, a single-part deep-drawn metal plated, or a multi-part deep-drawn metal plate, which is arranged in the region of the space for accommodating the at least one energy storage module.

6. The method as claimed in claim 1, wherein the body structure, on the top side of the space for accommodating the at least one energy storage module, is composed of steel at least in partial regions.

7. The method as claimed in claim 1, wherein the arrangement of the at least one energy storage module in the third step is performed, in a vehicle transverse direction, at least substantially outside a vehicle tunnel of the vehicle in the region of a body floor structure.

8. The method as claimed in claim 1, wherein, during the connection of the at least one energy storage module to the body structure, provision is made for a high-voltage (HV) assembly to be provided and connected to the body structure, wherein the HV assembly is composed of at least one of (i.) the at least one energy storage module and the at least one structural component, (ii.) at least one electrical rail, or (iii.) at least one temperature-control component/temperature-control unit.

9. The method as claimed in claim 8, wherein, during the connection of the HV assembly to the body structure, the at least one energy storage module or the at least one structural component are connected to the body structure, wherein the at least one energy storage module has no direct connection to, and is not in direct contact with, the installation protection structure.

10. The method as claimed in claim 1, wherein the at least one energy storage module is formed with integrated transverse-load paths.

11. The method as claimed in claim 1, wherein the at least one energy storage module is formed with integrated temperature-control.

12. The method as claimed in claim 1, wherein the connection between the body structure and the installation protection structure is of cohesive, non-positively locking and/or positively locking form.

13. The method as claimed in claim 1, wherein the connection of the body structure and of the installation protection structure is of water-tight form, and the sealing is realized by at least one of adhesive bonding, or compression/pressing-on of an elastic, plastic seal.

14. The method as claimed in claim 1, further comprising the step of:
checking the leak-tightness of the body structure, wherein the body structure leak-tightness check is performed after the step 1. of providing the body structure and before the step 3. of connecting the at least one energy storage module to the body structure.

15. The method as claimed in claim 1, further comprising the step of:
checking the leak-tightness of the overall system, wherein the overall system leak tightness check is performed after the step 5. of connecting the body structure to the installation protection structure.

16. The method as claimed in claim 1, wherein all steps 1.-5. are performed before the installation of a chassis of the vehicle.

* * * * *